(12) United States Patent
Hada

(10) Patent No.: US 8,433,599 B2
(45) Date of Patent: Apr. 30, 2013

(54) METHOD FOR DETERMINING AND CALCULATING WORK RELATED INCENTIVES

(75) Inventor: Satoshi Hada, Kanagawa (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/178,646

(22) Filed: Jul. 8, 2011

(65) Prior Publication Data

US 2012/0029968 A1    Feb. 2, 2012

(30) Foreign Application Priority Data

Jul. 30, 2010   (JP) .................................. 2010171757

(51) Int. Cl.
*G06Q 10/00*       (2012.01)
(52) U.S. Cl.
USPC .......................... 705/7.17; 705/7.13; 705/7.42
(58) Field of Classification Search ......... 705/7.11–7.42
See application file for complete search history.

(56) References Cited

U.S. PATENT DOCUMENTS

| | | | |
|---|---|---|---|
| 2002/0188489 A1* | 12/2002 | Cheng et al. ....................... | 705/8 |
| 2007/0038505 A1* | 2/2007 | Barnes, IV et al. .............. | 705/11 |
| 2009/0271252 A1* | 10/2009 | AmEnde ........................ | 705/11 |
| 2010/0023384 A1* | 1/2010 | Pollard et al. .................... | 705/11 |
| 2010/0241501 A1* | 9/2010 | Marshall ..................... | 705/14.13 |
| 2011/0015960 A1* | 1/2011 | Martin et al. ...................... | 705/8 |

FOREIGN PATENT DOCUMENTS

JP         2004295579 A     10/2004

OTHER PUBLICATIONS

Noam Nisan, Tim Roughgarden, Eva Tardos, and Vijay V. Vazirani, "Algorithmic Game Theory," Cambridge University Press, pp. 1-43, 2007.
Vincenzo Auletta, Roberto De Prisco, Paolo Penna, and Giuseppe Persiano, "The Power of Verification for One-Parameter Agents," Journal of Computer and System Sciences, vol. 75, Issue 3, 2009.
Nisan, Noam and Amir Ronen, "Algorithmic Mechanism Design," Games and Economic Behavior (35): pp. 166-196, 2001.

* cited by examiner

*Primary Examiner* — Johnna Loftis
*Assistant Examiner* — Sujay Koneru
(74) *Attorney, Agent, or Firm* — Cantor Colburn LLP; Gail Zarick

(57) ABSTRACT

A fair incentive calculating method with a reasonable amount of computation is performed by inputting a set of x jobs X={1, 2, ..., x} and processing times of each worker {t(i)} ($1 \leq i \leq n$) and providing a set of jobs W(A, X, t(i), t(−i)) assigned to each worker i, where A is a given scheduling algorithm; determining MaxInc(X, t(i)) by recursively solving MaxInc(X, t(i))= $\Sigma\_\{w \in X\}$ t(i, Kind(w))+max_{s(i) ∈Slower(t(i))} MaxInc (X, s(i)); and using the step of determining MaxInc(X, t(i)) to calculate an incentive NewInc(A, X, t(i), t(−i)) for each worker i based on NewInc(A, X, t(i), t(−i))=$\Sigma\_\{w \in W(A, X, t(i), t(-i))\}$ t(i, Kind(w))+max_{s(i) ∈Slower(t(i))} MaxInc (X, s(i)).

6 Claims, 3 Drawing Sheets

METHOD FOR DETERMINING AND CALCULATING WORK RELATED INCENTIVES

PRIORITY

This application claims priority to Japanese Patent Application No. 2010-165620, filed 23 Jul. 2010, and all the benefits accruing therefrom under 35 U.S.C. §119, the contents of which in its entirety are herein incorporated by reference.

FIELD OF THE INVENTION

The present invention relates to a technique of determining rewards (incentives) for work, and more particularly to an incentive determining method, program, and system for promoting fair working.

BACKGROUND

Conventionally, in an office workflow such as of an assessment of a loan, an assessment of a new insurance contract, or an assessment of an insurance payment, cost reduction has been attempted through optimum job assignment such that "assigning a difficult job to a high-skill/high-cost person and assigning an easy job to a low-skill/low-cost person." When such optimization is already implemented, further cost reduction requires improvement of each worker's skill.

For this purpose, incentives for encouraging workers to improve their skill should be designed appropriately so that fast workers are rewarded. To design incentives, the degree of contribution of each worker needs to be visualized as an index. However, if the number of jobs processed in a certain period is simply taken as an index, there may be a case where a large number of processed jobs actually results from choosing only easy jobs. If the average processing time per job is taken as an index, there may be a case where a 10-minute job is intentionally processed in 30 minutes. For this reason, the visualization is not easy.

Japanese Patent Laid-Open No. 2004-295579 aims to automatically evaluate a worker in a service providing system. An evaluation apparatus disclosed therein is applied to a service providing system in which common departments for processing tasks using a workflow are centralized and a worker processes submitted tasks. The evaluation apparatus acquires, for each task processed by a worker, the importance of the content of the task and the importance of settlement in the workflow. Based on the acquired importance of the content of the task and importance of settlement, an evaluation score for the worker who processed the task is calculated. Based on the evaluation score, the amount of compensation etc. for the worker is evaluated and the worker's skill level is determined. Unfortunately, the disclosed evaluation apparatus cannot appropriately address the aforementioned problem of slack off.

An incentive index toward "forcing workers to work hard" has been proposed based on an idea of Mechanism Design in game theory. See, for example, Nisan, Noam and Amir Ronen, "Algorithmic mechanism design," Games and Economic Behavior (35): pp. 166-196, 2001, and Noam Nisan, Tim Roughgarden, Eva Tardos, and Vijay V. Vazirani, "Algorithmic Game Theory," Cambridge University Press, 2007.

Many of such known incentive calculating methods are effective only for a particular scheduling algorithm (algorithm for assigning jobs to workers). As a result, the necessity of modifying the scheduling algorithm can be a barrier to introducing such an incentive index into an existing workflow system.

SUMMARY

It is an object of the present invention to improve the above known incentive calculating method to thereby provide a fairer incentive calculating method with a reasonable amount of computation.

The present invention has been made for achieving the above object and provides a method for determining incentives for workers through computer processing.

First, definitions and assumptions are given as follows:

k job types are denoted as $K=\{1, 2, \ldots, k\}$;

n workers are denoted as $M=\{1, 2, \ldots, n\}$;

a time required for a worker i to process a job of a type j is denoted as $t(i,j)$;

a type of a job w is denoted as $Kind(w)$;

$t(i)$ represents a vector $(t(i,1), t(i,2), \ldots, t(i,k))$;

$t(-i)$ is a vector $(t(1), t(2), t(i-1), t(i+1), \ldots, t(n))$ representing processing times of n−1 workers in the n workers except a worker i;

values that $t(i,j)$ can take for each job type are finite and common to all the workers;

a finite set of processing times for a type j is denoted as $T(j)$;

$T(j)$ is an ordered set whose elements are processing times;

processing time intervals in the ordered set are uniform for each job type;

$T=T(1)\times\ldots\times T(k)$ represents a processing time vector set for workers; and a set of all processing time vectors slower than t, given $t\in T$, is denoted as $Slower(t)$. Given two processing time vectors $t(1)$ and $t(2)$, it is defined that $t(2)$ is slower than $t(1)$ if $t(1,j)<t(2,j)$ holds for at least one job type j and if $t(1,j) t(2,j)$ holds for all job types j. Therefore t itself is not included in the set $Slower(t)$.

According to the present invention, incentives for workers i are determined through computer processing by performing the steps of:

inputting a set of x jobs $X=\{1, 2, \ldots, x\}$ and processing times of each worker $\{t(i)\}$ $(1\leq i\leq n)$ and providing a set of jobs $W(A, X, t(i), t(-i))$ assigned to each worker i, where A is a given scheduling algorithm;

determining $MaxInc(X, t(i))$ by recursively solving $MaxInc(X, t(i))=\Sigma_{\{w\in X\}} t(i, Kind(w))+\max_{\{s(i)\in Slower(t(i))\}} MaxInc(X, s(i))$; and using the step of determining $MaxInc(X, t(i))$ to calculate an incentive $NewInc(A, X, t(i), t(-i))$ based on $NewInc(A, X, t(i), t(-i))=\Sigma_{\{w\in W(A, X, t(i), t(-i))\}} t(i, Kind(w))+\max_{\{s(i)\in Slower(t(i))\}} MaxInc(X, s(i))$.

In one embodiment, the step of determining $MaxInc(X, t(i))$ includes:

where a next slower processing time given a processing time $t\in T(j)$ is denoted as $OneLevelSlower(t)$, and a subset of the job set X including only jobs of a type j is denoted as $X(j)$, (a) initializing a given variable, result, to 0;

(b) calculating $result=result+\Sigma_{\{w\in X\}} t(i, Kind(w))$;

(c) calculating and selecting a job type j such that $Diff=\Sigma_{\{w\in X(j)\}} OneLevelSlower(t(i,j))-\Sigma_{\{w\in X(j)\}} t(i,j)$ is a maximum, and outputting and returning result if $OneLevelSlower(t(i,j))$ does not exist for any job types j; and (d) setting a new $t(i)$ by replacing the processing time $t(i,j)$ corresponding to the selected job type j with $OneLevelSlower$ $(t(i,j))$, that is, calculating $t(i)=(t(i,1), t(i,2), \ldots, t(i,j-1),$ OneLevelSlower$(t(i,j)), t(i,j+1), \ldots, t(i,k))$, and returning to the step (b).

The present invention provides an incentive determining method in which an incentive is appropriately given for a worker working hard and which involves a reasonable amount of computation.

DETAILED DESCRIPTION

Figure 1:
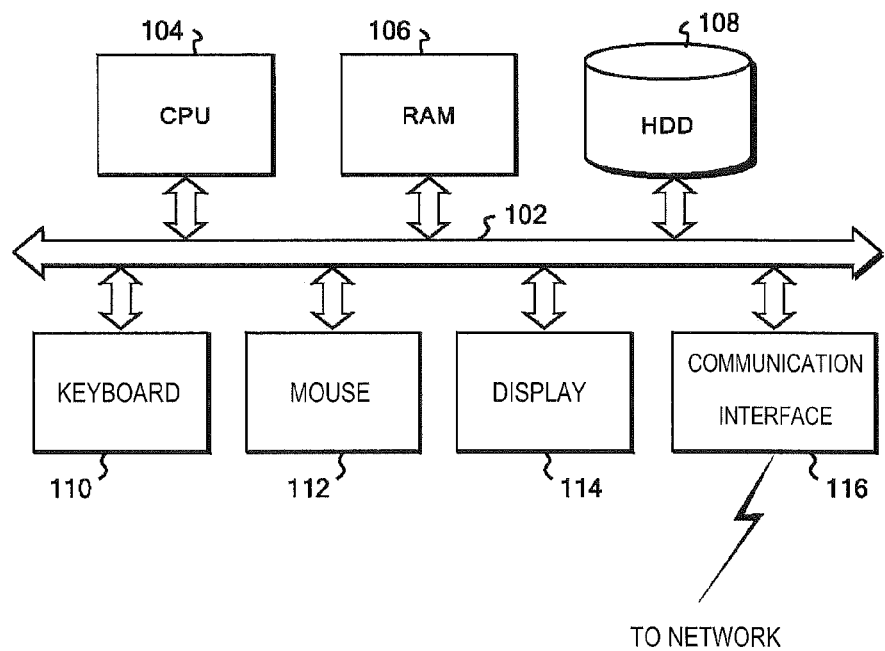
FIG. 1 is a block diagram of an example of hardware for implementing the present invention.

The above described known incentive calculating method has three disadvantages:

1. The method lacks fairness in that workers who process the same jobs in the same lengths of processing time (track records) may be given different incentive values.

2. The method cannot be applied to a workflow system in which no scheduling algorithm is used but jobs are manually assigned. Even if a scheduling algorithm is used, the method cannot be applied if the algorithm is not static but uses runtime information.

3. The method requires an exponential amount of computation for the incentive calculation.

Accordingly, an incentive index effective for any scheduling algorithms is desired. The present embodiments calculate an incentive by using track records of the lengths of time required for each worker to process jobs, computed from a workflow system. It is known that, when such track records are used, an incentive index effective for any (static) scheduling algorithms exists (See, for example, Vincenzo Auletta, Roberto De Prisco, Paolo Penna, and Giuseppe Persiano, "The power of verification for one-parameter agents," Journal of Computer and System Sciences, Volume 75, Issue 3 (May 2009)). An embodiment of the present invention will be described below based on the drawings. Unless otherwise stated, like reference numerals refer to like objects throughout the drawings. It is to be understood that the following description is given for an embodiment of the present invention but does not intend to limit the present invention to what is described in the embodiment.

With reference to FIG. 1, a block diagram of computer hardware for implementing a system configuration and processing according to an embodiment of the present invention is shown. In FIG. 1, a CPU 104, a main memory (RAM) 106, a hard disk drive (HDD) 108, a keyboard 110, a mouse 112, and a display 114 are connected to a system bus 102. The CPU 104 is preferably based on a 32-bit or 64-bit architecture and may be implemented by Pentium™ 4, Core™ 2 Duo, or Xeon™ of Intel Corporation, or Athlon™ of Advanced Micro Devices, Inc., for example. The main memory 106 preferably has a capacity of 2 GB or more. The hard disk drive 108 preferably has a capacity of 320 GB or more, for example.

Although not individually illustrated, an operating system is stored in advance in the hard disk drive 108. The operating system may be any one that is compatible with the CPU 104, such as Linux™, or Windows™ 7, Windows XP™, or Windows™ 2000 of Microsoft Corporation, or Mac OS™ of Apple Inc.

The hard disk drive 108 further stores a file of a work (workflow) log 202, a processing time measuring module 204, a scheduling module 206, and an incentive calculating module 208 to be described later with reference to FIG. 2. These modules may be created with an existing programming language processor such as C, C++, C#, or Java (R), and are loaded into the main memory 106 and executed as appropriate through the operation of the operating system.

The keyboard 110 and the mouse 112 are used for starting processing of collecting the aforementioned workflow log, and for starting the processing time measuring module 204, the scheduling module 206, and the incentive calculating module 208, and for entering text.

The display 114 is preferably a liquid crystal display and may be implemented by a display with any resolution, for example XGA (a 1024×768 resolution) or UXGA (a 1600× 1200 resolution). The display 114 is used for purposes such as displaying a graph generated from the workflow log.

The system in FIG. 1 is further connected to an external network such as a LAN or a WAN via a communication interface 116 connected to the bus 102. The communication interface 116 provides for data exchange with systems such as a server on the external network through a mechanism such as Ethernet™.

Client systems (not shown) operated by workers are connected to the server (not shown), and the workflow log resultant from operations of the workers is accumulated in the server over the network. Accordingly, the file of the workflow log 202 may actually reside in the server rather than in the system in FIG. 1, or part or all of the file of the workflow log 202 may be transferred to the hard disk drive 108 of the system in FIG. 1 over the network.

Now, with reference to FIG. 2, the file held in the hard disk drive 108 and the operation of the functional modules will be described in connection to the present invention.

Figure 2:
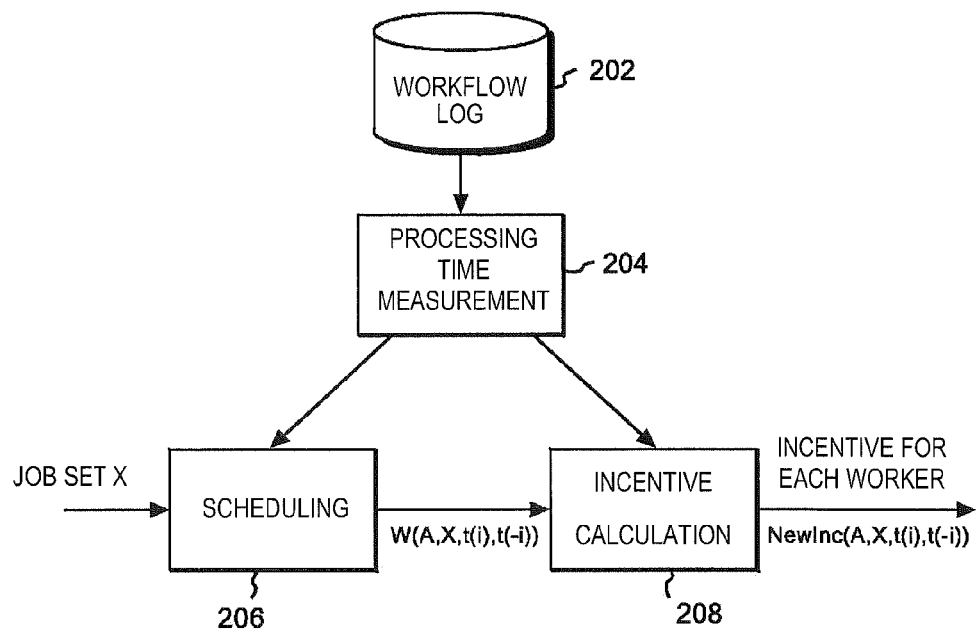
FIG. 2 is a diagram of functional blocks for implementing the present invention.

In FIG. 2, the workflow log 202 is a file held in the hard disk drive 108 and includes data such as the start time of a job, the finish time of the job, the type of the job, and the ID of a worker who did the job. The entries of the workflow log 202 are preferably collected in such a manner that the entries are once gathered over the network into the server from the client systems (not shown) operated by the workers and then transmitted to the system in FIG. 1. The workflow log 202 may be in any formats compatible with computer processing, such as CSV or XML.

The processing time measuring module 204 scans the entries of the workflow log 202 to statistically calculate the following information.

k job types: $K=\{1, 2, \ldots, k\}$

IDs of n workers: $M=\{1, 2, \ldots, n\}$ a time required for a worker i to process a job of a type j: $t(i,j)$ a finite set of processing times for a type j: $T(j)$ Further, the following values are defined and used.

$t(i)$ that is a vector $(t(i,1), t(i,2), \ldots, t(i,k))$ $t(-i)$ that is a vector $(t(1), t(2), t(i-1), t(i+1), \ldots, t(n))$ representing processing times of n−1 workers in the n workers except a worker i $T=T(1)\times \ldots \times T(k)$ that is a processing time vector set for workers Slower(t) that is a set of all processing time vectors slower than t, given t∈T Thus, according to the present invention, the processing time vector $t(i)$ for each worker i is computed from an execution log of a workflow log (workflow system) for a past certain period. For example, t(i) may be computed as averages, or as three levels of 1, 2, and 3 meaning Fast, Medium, and Slow. Each worker's t(i) may be periodically updated.

Where t(i) denotes true processing times of a worker i, and b(i) denotes processing times computed from the log of the workflow system, the following three cases are conceivable.

Case 1: b(i)=t(i). This corresponds to a case where the worker i worked hard.

Case 2: b(i)∈Slower(t(i)). This corresponds to a case where the worker i slacked off. For example, it is a case where a job that was actually be able to be finished in 10 minutes was intentionally made to seem finished in 20 minutes on the workflow system, meaning that the job could be processed faster.

Case 3: t(i)∈Slower(b(i)). This is the opposite to the above case and means that "it actually took more time to process the job." However, as long as b(i) is computed from the workflow log, this case can be supposed to never occur.

Thus, it is an object of the present invention to provide incentive design so that an incentive given to a worker is maximized in the case 1 and a fraudulent worker as in the case 2 is prevented from being rewarded.

The scheduling module 206 receives an input of a set of jobs X={1, 2, . . . , x}, and uses data provided from the processing time measuring module 204 to calculate and output a set of jobs W(A, X, t(i), t(−i)) assigned to each worker i, where A is a certain scheduling algorithm.

In typical scheduling, the processing times {t(i)} of each worker is taken into account to minimize the processing time to finish all the jobs. The present invention does not assume a specific scheduling algorithm. Notably, the present invention is effective for even manual scheduling. The scheduling algorithm may be either an online algorithm or an offline algorithm. In the case of an online algorithm, the input job set X is initially an empty set, to which jobs are added one by one. In any case, it is assumed hereinafter that a certain scheduling algorithm A is used.

The incentive calculating module 208 uses data provided from the processing time measuring module 204 and values of the set of jobs W(A, X, t(i), t(−i)) assigned to each worker i provided from the scheduling module 206 to calculate and output an incentive NewInc(A, X, t(i), t(−i)) for each worker i according to an algorithm of the present invention. The calculation of NewInc(A, X, t(i), t(−i)) will be described in detail according to flowcharts in FIGS. 3 and 4.

Figure 3:
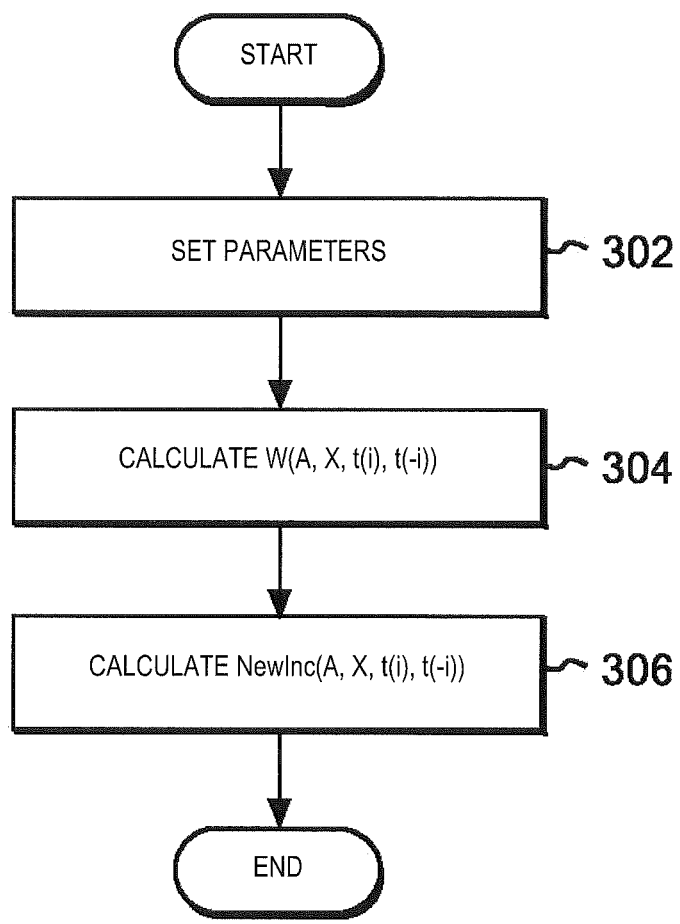
FIG. 3 is a diagram showing a flowchart of an incentive calculation process of the present invention.

Turning to FIG. 3, in step 302, the processing time measuring module 204 scans the entries of the workflow log 202 to calculate K={1, 2, . . . , k}, M={1, 2, . . . , n}, t(i,j), and T(j) described above. Also, the following are defined: t(i) that is a vector (t(i,1), t(i,2), . . . , t(i,k)); t(−i) that is a vector (t(1), t(2), . . . , t(i−1), t(i+1), . . . , t(n)) representing processing times of n−1 workers in the n workers except a worker i; T=T(1)× . . . ×T(k) that is a processing time vector set for workers; and Slower(t) that is a set of all processing time vectors slower than t, given t∈T.

In step 304, the scheduling module 206 receives an input of a set of jobs X={1, 2, . . . , x}, and uses data provided from the processing time measuring module 204 to calculate and output a set of jobs W(A, X, t(i), t(−i)) assigned to each worker i.

In step 306, the incentive calculating module 208 calculates MaxInc(X, t(i)), and calculates an incentive NewInc(A, X, t(i), t(−i)) for the worker i based on NewInc(A, X, t(i), t(−i))=Σ_{w∈W(A, X, t(i), t(−i))} t(i, Kind(w))+max_{s(i)∈Slower(t(i))} MaxInc(X, s(i)). The incentive calculating module 208 outputs the calculation result for each worker i. However, for calculating a maximum based on max_{s(i)∈Slower(t(i))}, it is not necessary to take all processing time vectors included in Slower(t(i)) into account. Rather, only processing time vectors included in OneLevelSlower(t(i)), which is a subset of Slower(t(i)), need to be taken into account. That is, max_{s(i)∈Slower(t(i))} may be replaced with max_{s(i)∈OneLevelSlower(t(i))}. OneLevelSlower(t(i)) is defined as follows. Given a processing time vector t(i)=(t(i,1), t(i,2), . . . , t(i,k)), OneLevelSlower(t(i)) is defined as a set of processing time vectors each of which has one of its elements replaced with the next slower processing time:
OneLevelSlower(t(i))={
(OneLevelSlower(t(i,1)), t(i,2), . . . , t(i,k)),
(t(i,1), OneLevelSlower(t(i,2)), . . . , t(i,k)), . . . ,
(t(i,1), t(i,2), . . . , OneLevelSlower(t(i,k))}
where a processing time vector corresponding to a job type j for which OneLevelSlower(t(i,j)) does not exist is not included in OneLevelSlower(t(i)). As a result, since OneLevelSlower(t(i)) is of a size of the number of job types k at most, max_{s(i)∈OneLevelSlower(t(i))} is easily calculated.

At this point, the incentive calculating module 208 calculates MaxInc(X, t(i)) by recursively solving MaxInc(X, t(i))=Σ_{w∈X} t(i, Kind(w))+max_{s(i)∈Slower(t(i))} MaxInc(X, s(i)). Specifically, this calculation is performed by invoking a subroutine illustrated in the flowchart of FIG. 4 to be described later.

Σ_{w∈X} t(i, Kind(w)) is expressed in a more mathematically conventional form as $$\sum_{w \in X} t(i, \text{kind}(w)) \qquad \text{[Expression 1]}$$

Also, max_{s(i)∈Slower(t(i))} MaxInc(X, s(i)) is expressed in a more mathematically conventional form as $$\max_{s(i) \in Slower(t(i))} MaxInc(X, s(i)) \qquad \text{[Expression 2]}$$

The above notation for convenience applies throughout this specification.

Figure 4:
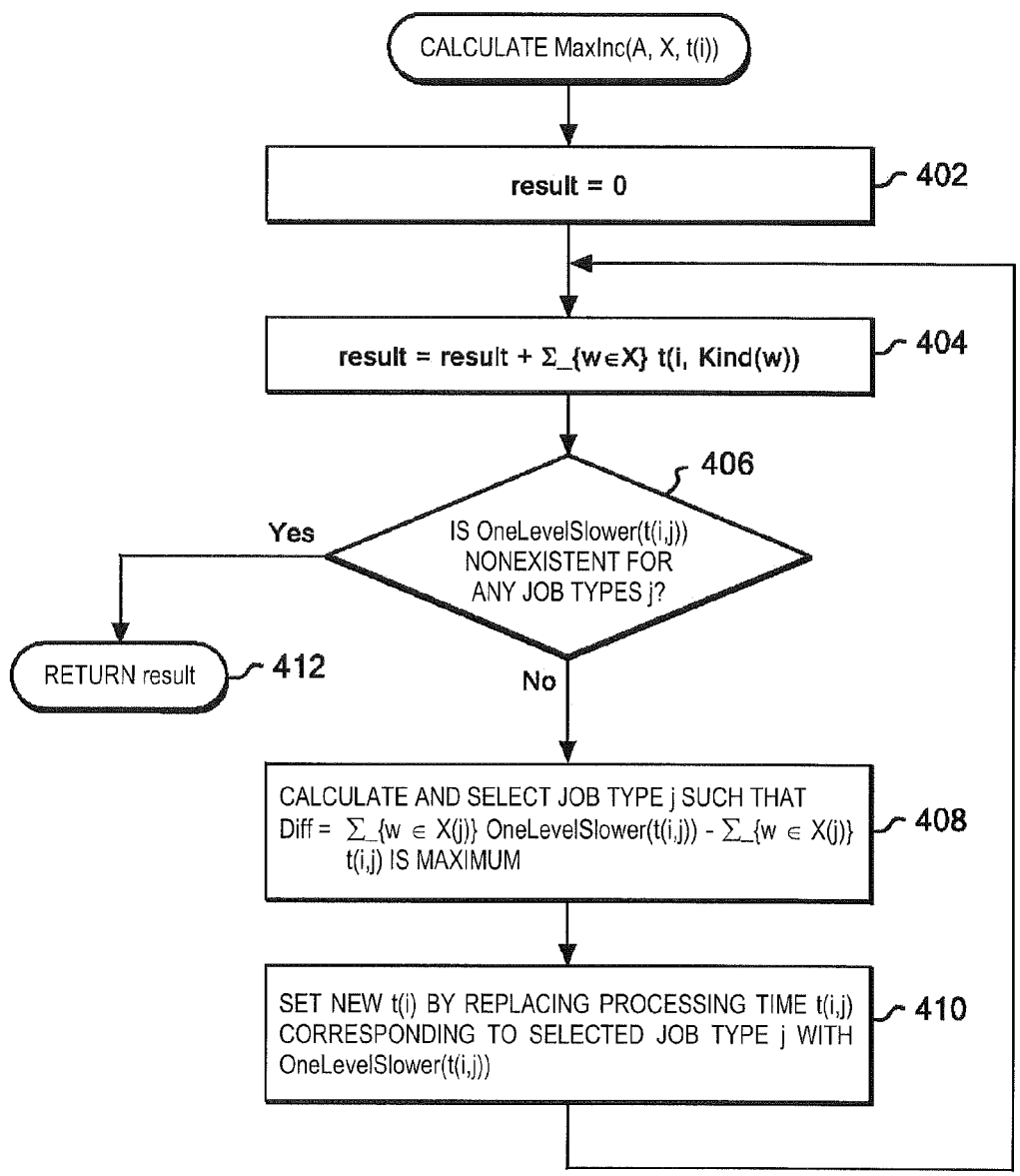
FIG. 4 is a diagram showing a flowchart of a process of a subroutine invoked from the incentive calculation process of the present invention.

Now, with reference to the flowchart of FIG. 4, a process of the subroutine for calculating MaxInc(X, t(i)) will be described.

In step 402, the subroutine initializes result=0.

In step 404, the subroutine calculates result=result+Σ_{w∈X} t(i, Kind(w)).

In step 406, the subroutine determines whether OneLevelSlower(t(i,j)) does not exist for any job types j. Here, OneLevelSlower(t) is the next slower processing time given a processing time t∈T(j). If OneLevelSlower(t(i,j)) does not exist for any job types j, the subroutine returns result in step 412, and the process terminates.

If the subroutine determines that OneLevelSlower(t(i,j)) exists for a job type j in step 406, the process proceeds to step 408.

In step 408, the subroutine takes X(j) that is a subset of the job set X including only jobs of a type j, and calculates and selects a job type j such that Diff=Σ_{w∈X(j)} OneLevelSlower(t(i,j))−Σ_{w∈X(j)} t(i,j) is the maximum.

The subroutine then proceeds to step 410 to set a new t(i) by replacing the processing time t(i,j) corresponding to the selected job type j with OneLevelSlower(t(i,j)), that is, calculate t(i)=(t(i,1), t(i,2), . . . , t(i,j−1), OneLevelSlower(t(i,j)), t(i,j+1), . . . , t(i,k)). The process then returns to step 404.

It is assumed that values that the processing time t(i,j) can take for each job type form a finite set T(j) and common to all the workers. For example, if T(j)={t1, t2, . . . , tn} and if an order relation of t1<t2<. . .<tn holds, this means that t1 is the fastest and tn is the slowest. Given a processing time t∈T(j), the next slower processing time is OneLevelSlower(t) described above. Processing time intervals are assumed to be uniform for each job type. That is, the value of OneLevelSlower(t)−t is always fixed for each job type. On these assumptions, since t(i,j) can take finite values, the nonexistence of OneLevelSlower(t(i,j)) for any job types j in step 406 is inevitably encountered while the loop from step 404 to step 412 is repeated. Therefore the subroutine can appropriately return result.

Now, for demonstrating advantages of the present invention, detailed examples of the incentive calculation will be provided. For convenience of calculation, it is assumed as follows.

M={1, 2}: there are only two workers.

K={1, 2}: there are only two types of jobs.

Values that the processing time for the two types can take are T(1)={1, 2, 3} and T(2)={4, 5, 6}, respectively.

X={1, 2, 3, 4}: there are only four jobs.

The types of the jobs are Kind(1)=1, Kind(2)=2, Kind(3)=1, and Kind(4)=2.

The two workers have the same processing time vector:

$$t(1)=\{t(1,1)=2, t(1,2)=5\}$$

$$t(2)=\{t(2,1)=2, t(2,2)=5\}$$

In the following examples, Slower({2, 5})={{3, 5}, {2, 6}, {3, 6}}.

Given the above data, examples of calculation according to a conventional method based on the non patent literature 3 will be provided first. According to the conventional method based on the non patent literature 3, an incentive Inc(A, X, t(i), t(−i)) for a worker i is calculated with the following equation.

$$Inc(A,X,t(i),t(-i))=\Sigma\_\{w \in W(A,X,t(i),t(-i))\}t(i,Kind(w))+\max\_\{s(i) \in Slower(t(i))\}Inc(A,X,s(i),t(-i))$$

A table below shows correspondences of processing time vectors for the worker 1 and jobs assigned to the worker 1. The jobs are assigned by the scheduling module 206 using the scheduling algorithm A. That is, the worker 1 with the processing time vector t(1)={2, 5} is assigned the jobs {1, 2}. If, for example, the worker 1 had the processing time vector {3, 5}∈Slower(t(1)), the job {1} were assigned.

TABLE 1

| PROCESSING TIME VECTOR | | JOBS ASSIGNED TO WORKER 1 |
|---|---|---|
| t(1) | {2, 5} | {1, 2} |
| Slower(t(1)) | {3, 5} | {1} |
|  | {2, 6} | {2} |
|  | {3, 6} | {1, 2} |

If the job assignment in Table 1 is performed, the incentive calculation for the worker 1 is as follows. Inc(A, X, {2, 5}, t(−1)), which is the incentive for t(1)={2, 5}, is the incentive for the worker 1.

the incentive for $t(1) = \{3, 6\}$ $Inc(A, X, \{3, 6\}, t(-1)) = \Sigma\_\{w \in \{1, 2\}\}t(1, Kind(w)) +$
$\qquad \max\_\{s \in Slower(\{3, 6\})\}$
$\qquad Inc(A, X, s, t(-1))$
$\qquad = 9 + 0 = 9$ the incentive for $t(1) = \{3, 5\}$ $Inc(A, X, \{3, 5\}, t(-1)) = \Sigma\_\{w \in \{1\}\}t(1, Kind(w)) +$
$\qquad \max\_\{s \in Slower(\{3, 5\})\}$
$\qquad Inc(A, X, s, t(-1))$
$\qquad = 3 + \max\_\{s \in Slower(\{3, 5\})\}$
$\qquad Inc(A, X, s, t(-1))$
$\qquad = 3 + 9 = 12$ the incentive for $t(1) = \{2, 6\}$ $Inc(A, X, \{2, 6\}, t(-1)) = \Sigma\_\{w \in \{2\}\}t(1, Kind(w)) +$
$\qquad \max\_\{s \in Slower(\{2, 6\})\}$
$\qquad Inc(A, X, s, t(-1))$
$\qquad = 6 + \max\_\{s \in Slower(\{2, 6\})\}$
$\qquad Inc(A, X, s, t(-1))$
$\qquad = 6 + 9 = 15$ the incentive for $t(1) = \{2, 5\}$ $Inc(A, X, \{2, 5\}, t(-1)) = \Sigma\_\{w \in \{1, 2\}\}t(1, Kind(w)) +$
$\qquad \max\_\{s \in Slower(\{2, 5\})\}$
$\qquad Inc(A, X, s, t(-1))$
$\qquad = 7 + \max\_\{s \in Slower(\{2, 5\})\}$
$\qquad Inc(A, X, s, t(-1))$
$\qquad = 7 + 15 = 22$ A table below shows correspondences of processing time vectors for the worker 2 and jobs assigned to the worker 2. The jobs are assigned by the scheduling module 206 using the scheduling algorithm A.

TABLE 2

| PROCESSING TIME VECTOR | | JOBS ASSIGNED TO WORKER 2 |
|---|---|---|
| t(2) | {2, 5} | {3, 4} |
| Slower(t(2)) | {3, 5} | {3, 4} |
|  | {2, 6} | {3, 4} |
|  | {3, 6} | {3, 4} |

If the job assignment in Table 2 is performed, the incentive calculation for the worker 2 is as follows. Inc(A, X, {2, 5}, t(−2)), which is the incentive for t(2)={2, 5}, is the incentive for the worker 2.

the incentive for $t(2) = \{3, 6\}$ $Inc(A, X, \{3, 6\}, t(-2)) = \Sigma\_\{w \in \{3, 4\}\}t(2, Kind(w)) +$
$\qquad \max\_\{s \in Slower(\{3, 6\})\}$
$\qquad Inc(A, X, s, t(-2))$
$\qquad = 9 + 0 = 9$ the incentive for $t(2) = \{3, 5\}$ $Inc(A, X, \{3, 5\}, t(-2)) = \Sigma\_\{w \in \{3, 4\}\}t(2, Kind(w)) +$
$\qquad \max\_\{s \in Slower(\{3, 5\})\}$
$\qquad Inc(A, X, s, t(-2))$
$\qquad = 8 + \max\_\{s \in Slower(\{3, 5\})\}$
$\qquad Inc(A, X, s, t(-2))$
$\qquad = 8 + 9 = 17$ -continued the incentive for $t(2) = \{2, 6\}$ $$Inc(A, X, \{2, 6\}, t(-2)) = \Sigma\_\{w \in \{3, 4\}\}t(2, Kind(w)) +$$
$$\max\_\{s \in Slower(\{2, 6\})\}$$
$$Inc(A, X, s, t(-2))$$
$$= 8 + \max\_\{s \in Slower(\{2, 6\})\}$$
$$Inc(A, X, s, t(-2))$$
$$= 8 + 9 = 17$$

the incentive for $t(2) = \{2, 5\}$ $$Inc(A, X, \{2, 5\}, t(-2)) = \Sigma\_\{w \in \{3, 4\}\}t(2, Kind(w)) +$$
$$\max\_\{s \in Slower(\{2, 5\})\}$$
$$Inc(A, X, s, t(-2))$$
$$= 7 + \max\_\{s \in Slower(\{2, 5\})\}$$
$$Inc(A, X, s, t(-2))$$
$$= 7 + 17 = 24$$

As above, although the worker 1 and the worker 2 are assigned the same number of jobs of the same types, their incentives take the different values, 22 and 24. Thus, it can be seen that, according to the scheme of the conventional technique, the incentives are not calculated fair between the workers assumed to have the same ability.

Next, examples of calculation according to the method of the present invention will be provided.

A table below shows correspondences of processing time vectors for the worker 1 and jobs assigned to the worker 1. The jobs are assigned by the scheduling module 206 using the scheduling algorithm A. Job assignment for the processing time vectors of Slower(t(1)) is not taken into account in the method of the present invention and therefore omitted in the table.

TABLE 3

| PROCESSING TIME VECTOR | | JOBS ASSIGNED TO WORKER 1 |
|---|---|---|
| t(1) | {2, 5} | {1, 2} |
| Slower(t(1)) | {3, 5} | UNRELATED |
| | {2, 6} | UNRELATED |
| | {3, 6} | UNRELATED |

If the job assignment in Table 3 is performed, the incentive calculation is as follows.

calculation of $MaxInc$ for $t(1) = \{3, 6\}$ $$MaxInc(X, t(1)) = \Sigma\_\{w \in \{1, 2, 3, 4\}\}t(1, Kind(w)) +$$
$$\max\_\{s \in Slower(\{3, 6\})\}$$
$$MaxInc(X, s,)$$
$$= 18 + 0 = 18$$

calculation of $MaxInc$ for $t(1) = \{3, 5\}$ $$MaxInc(X, t(1)) = \Sigma\_\{w \in \{1, 2, 3, 4\}\}t(1, Kind(w)) +$$
$$\max\_\{s \in Slower(\{3, 5\})\}$$
$$MaxInc(X, s)$$
$$= 16 + 18 = 34$$

calculation of $MaxInc$ for $t(1) = \{2, 6\}$ $$MaxInc(X, t(1)) = \Sigma\_\{w \in \{1, 2, 3, 4\}\}t(1, Kind(w)) +$$
$$\max\_\{s \in Slower(\{2, 6\})\}$$
$$MaxInc(X, s)$$
$$= 16 + 18 = 34$$

For $t(1) = \{2, 5\}$, the incentive for the worker 1 is calculated as follows.

$$NewInc(A, X, \{2, 5\}, t(-1)) = \Sigma\_\{w \in \{1, 2\}\}t(1, Kind(w)) +$$
$$\max\_\{s \in Slower(\{2, 5\})\}$$
$$MaxInc(X, s)$$
$$= 7 + \max\_\{s \in Slower(\{2, 5\})\}$$
$$MaxInc(X, s)$$
$$= 7 + 34 = 41$$

A table below shows correspondences of processing time vectors for the worker 2 and jobs assigned to the worker 2. The jobs are assigned by the scheduling module 206 using the scheduling algorithm A. Job assignment for the processing time vectors of Slower(t(2)) is not taken into account in the method of the present invention and therefore omitted in the table.

TABLE 4

| PROCESSING TIME VECTOR | | JOBS ASSIGNED TO WORKER 2 |
|---|---|---|
| t(2) | {2, 5} | {3, 4} |
| Slower(t(2)) | {3, 5} | UNRELATED |
| | {2, 6} | UNRELATED |
| | {3, 6} | UNRELATED |

If the job assignment in Table 4 is performed, the incentive calculation is as follows. Values of MaxInc( ) are the same as in the above calculation examples and therefore omitted. For t(2)={2, 5}, the incentive for the worker 2 is as follows.

$$NewInc(A, X, \{2, 5\}, t(-2)) = \Sigma\_\{w \in \{3, 4\}\}t(2, Kind(w)) +$$
$$\max\_\{s \in Slower(\{2, 5\})\}$$
$$MaxInc(X, s)$$
$$= 7 + \max\_\{s \in Slower(\{2, 5\})\}$$
$$MaxInc(X, s)$$
$$= 7 + 34 = 41$$

Thus, the calculation result is exactly the same as the incentive for the worker 1. That is, the unfairness in the conventional technique is resolved in the incentive calculation of the present invention.

While the term max_{s(i)∈Slower(t(i))} Inc(A, X, s(i), t(−1)) needs to be calculated in the conventional method, calculating the part of max requires using the pseudo-processing time vector s(i) to simulate the scheduling algorithm A. Therefore the conventional method cannot be applied to a case where jobs are manually assigned. In addition, since the completion time of human-performed job processing usually varies for different reasons, a precise completion time is unknown. If the scheduling algorithm A uses such runtime information, the conventional method cannot be applied. In contrast, the present invention can be applied to any scheduling algorithm A.

Further, since the size of the set Slower(t(i)) exponentially increases with the number of job types, the part of max involves an enormous amount of computation. Otherwise, another efficient algorithm needs to be designed by taking the characteristics of the scheduling algorithm A into account.

For the incentive calculation of the present invention, the scheduling algorithm no longer appears in the calculation of the part of max. Rather, the algorithm illustrated in the flowchart of FIG. 4 can be used to calculate the part of max efficiently. Therefore, also with respect to the amount of computation, the present invention is more advantageous than the above conventional method. That is, while the conventional technique requires the amount of computation of almost exponential time corresponding to the number of job types, the present invention can reduce the amount of computation to approximately polynomial time.

While the present invention has been described above according to a specific embodiment, the present invention can be implemented on any computer systems without being limited by a particular operating system or platform. The system may not be a networked system but a standalone system, for example.

What is claimed is:

1. A method for determining incentives for workers, the method comprising:
   receiving, by a computer, an input comprising a set of x jobs X and processing times of each worker $\{t(i)\}$ ($1 \leq i \leq n$) and a set of jobs W(A, X, t(i), t(−i)) assigned to each worker i, where A is a given scheduling algorithm;
   determining, with the computer, MaxInc(X, t(i)) by recursively solving MaxInc(X, t(i))=$\Sigma\_\{w \in X\}$ t(i, Kind(w))+max\_$\{s(i) \in Slower(t(i))\}$ MaxInc(X, s(i)) through the processing by the computer; and
   using MaxInc(X, t(i)) to calculate an incentive NewInc(A, X, t(i), t(−i)) for each worker i based on NewInc(A, X, t(i), t(−i))=$\Sigma\_\{w \in W(A, X, t(i), t(-i))\}$ t(i, Kind(w))+max\_$\{s(i) \in Slower(t(i))\}$ MaxInc(X, s(i)), where s(i) is a vector representing a pseudo-processing time, wherein:
   k job types are denoted as K=$\{1, 2, \ldots, k\}$;
   n workers are denoted as M=$\{1, 2, \ldots, n\}$;
   a time required for a worker i to process a job of a type j is denoted as t(i,j);
   a type of a job w is denoted as Kind(w);
   t(i) represents a vector (t(i,1), t(i,2), ..., t(i,k));
   t(−i) is a vector (t(1), t(2), t(i−1), t(i+1), ..., t(n)) representing processing times of n−1 workers in the n workers except a worker i;
   values that t(i,j) can take for each job type are finite and common to all the workers;
   a finite set of processing times for a type j is denoted as T(j);
   T(j) is an ordered set whose elements are processing times;
   processing time intervals in the ordered set are uniform for each job type;
   T=T(1)× ... ×T(k) represents a processing time vector set for workers; and
   a set of all processing time vectors slower than t, given t∈T, is denoted as Slower(t).

2. The method according to claim 1, wherein determining MaxInc(X, t(i)) comprises:
   where a next slower processing time given a processing time t∈T(j) is denoted as OneLevelSlower(t),
   initializing a given variable, result, to 0;
   calculating result=result+$\Sigma\_\{w \in X\}$ t(i, Kind(w));
   calculating and selecting a job type j such that Diff=$\Sigma\_\{w \in X(j)\}$ OneLevelSlower(t(i,j))−$\Sigma\_\{w \in X(j)\}$ t(i,j) is a maximum, where X(j) is a subset of the job set X including only jobs of a type j, and outputting and returning result if OneLevelSlower(t(i,j)) does not exist for any job types j; and
   setting a new t(i) by replacing the processing time t(i,j) corresponding to the selected job type j with OneLevelSlower(t(i,j)), that is, calculating t(i)=(t(i,1), t(i,2), ..., t(i,j−1), OneLevelSlower(t(i,j)), t(i,j+1), ..., t(i,k)), and returning to the calculating result.

3. A computer program product comprising a non-transitory, computer readable medium having computer readable instructions stored thereon that, when executed by a computer, implement a method for determining incentives for workers wherein the method comprises:
   receiving an input comprising a set of x jobs X and processing times of each worker $\{t(i)\}$ ($1 \leq i \leq n$) and a set of jobs W(A, X, t(i), t(−i)) assigned to each worker i, where A is a given scheduling algorithm;
   determining MaxInc(X, t(i)) by recursively solving MaxInc(X, t(i))=$\Sigma\_\{w \in X\}$ t(i, Kind(w))+max\_$\{s(i) \in Slower(t(i))\}$ MaxInc(X, s(i)) through the processing by the computer, where s(i) is a vector representing a psoudo-processing time; and
   using MaxInc(X, t(i)) to calculate an incentive NewInc(A, X, t(i), t(−i)) for each worker i based on NewInc(A, X, t(i), t(−i))=$\Sigma\_\{w \in W(A, X, t(i), t(-i))\}$ t(i, Kind(w))+max\_$\{s(i) \in Slower(t(i))\}$ MaxInc(X, s(i)), wherein:
   k job types are denoted as K=$\{1, 2, \ldots, k\}$;
   n workers are denoted as M=$\{1, 2, \ldots, n\}$;
   a time required for a worker i to process a job of a type j is denoted as t(i,j);
   a type of a job w is denoted as Kind(w);
   t(i) represents a vector (t(i,1), t(i,2), ..., t(i,k));
   t(−i) is a vector (t(1), t(2), t(i−1), t(i+1), ..., t(n)) representing processing times of n−1 workers in the n workers except a worker i;
   values that t(i,j) can take for each job type are finite and common to all the workers;
   a finite set of processing times for a type j is denoted as T(j);
   T(j) is an ordered set whose elements are processing times;
   processing time intervals in the ordered set are uniform for each job type;
   T=T(1)× ... ×T(k) represents a processing time vector set for workers; and
   a set of all processing time vectors slower than t, given t∈T, is denoted as Slower(t).

4. The computer program product according to claim 3, wherein determining MaxInc(X, t(i)) comprises:
   where a next slower processing time given a processing time t∈T(j) is denoted as OneLevelSlower(t),
   initializing a given variable, result, to 0;
   calculating result=result+$\Sigma\_\{w \in X\}$ t(i, Kind(w));
   calculating and selecting a job type j such that Diff=$\Sigma\_\{w \in X(j)\}$ OneLevelSlower(t(i,j))−$\Sigma\_\{w \in X(j)\}$ t(i,j) is a maximum, where X(j) is a subset of the job set X including only jobs of a type j, and outputting and returning result if OneLevelSlower(t(i,j)) does not exist for any job types j; and
   setting a new t(i) by replacing the processing time t(i,j) corresponding to the selected job type j with OneLevelSlower(t(i,j)), that is, calculating t(i)=(t(i,1), t(i,2), ..., t(i,j−1), OneLevelSlower(t(i,j)), t(i,j+1), ..., t(i,k)), and returning to the calculating result.

5. A system for determining incentives for workers comprising:
a processing device configured to:
receive an input comprising a set of x jobs X and processing times of each worker $\{t(i)\}$ ($1 \leq i \leq n$) and a set of jobs W(A, X, t(i), t(−i)) assigned to each worker i, where A is a given scheduling algorithm;
determine MaxInc(X, t(i)) by recursively solving MaxInc(X, t(i))=$\Sigma\_\{w \in X\}$ t(i, Kind(w))+max_{s(i)∈Slower(t(i))} MaxInc(X, s(i)) through the processing by the computer; and
use MaxInc(X, t(i)) to calculate an incentive NewInc(A, X, t(i), t(−i)) for each worker i based on NewInc(A, X, t(i), t(−i))=$\Sigma\_\{w \in W(A, X, t(i), t(-i))\}$ t(i, Kind(w))+max_{s(i)∈Slower(t(i))} MaxInc(X, s(i)), where s(i) is a vector representing a psoudo-processing time, wherein:
k job types are denoted as K={1, 2, . . . , k};
n workers are denoted as M={1, 2, . . . , n};
a time required for a worker i to process a job of a type j is denoted as t(i,j);
a type of a job w is denoted as Kind(w);
t(i) represents a vector (t(i,1), t(i,2), . . . , t(i,k));
t(−i) is a vector (t(1), t(2), t(i−1), t(i+1), . . . , t(n)) representing processing times of n−1 workers in the n workers except a worker i;
values that t(i,j) can take for each job type are finite and common to all the workers;
a finite set of processing times for a type j is denoted as T(j);
T(j) is an ordered set whose elements are processing times;
processing time intervals in the ordered set are uniform for each job type;
T=T(1)× . . . ×T(k) represents a processing time vector set for workers; and
a set of all processing time vectors slower than t, given t∈T, is denoted as Slower(t).

6. The system according to claim 5, wherein the processing device is further configured to determining MaxInc(X, t(i)) by:
where a next slower processing time given a processing time t∈T(j) is denoted as OneLevelSlower(t),
initializing a given variable, result, to 0;
calculating result=result+$\Sigma\_\{w \in X\}$ t(i, Kind(w));
calculating and selecting a job type j such that Diff=$\Sigma\_\{w \in X(j)\}$ OneLevelSlower(t(i,j))−$\Sigma\_\{w \in X(j)\}$ t(i,j) is a maximum, where X(j) is a subset of the job set X including only jobs of a type j, and outputting and returning result if OneLevelSlower(t(i,j)) does not exist for any job types j; and
setting a new t(i) by replacing the processing time t(i,j) corresponding to the selected job type j with OneLevelSlower(t(i,j)), that is, calculating t(i)=(t(i,1), t(i,2), . . . , t(i,j−1), OneLevelSlower(t(i,j)), t(i,j+1), . . . , t(i,k)), and returning to the calculating result.

\* \* \* \* \*